United States Patent
Maloney et al.

(10) Patent No.: US 6,655,358 B2
(45) Date of Patent: Dec. 2, 2003

(54) ENGINE STARTING AND WARM-UP FUEL CONTROL METHOD HAVING LOW VOLATILITY FUEL DETECTION AND COMPENSATION

(75) Inventors: Peter James Maloney, Dearborn, MI (US); In Kwang Yoo, Ann Arbor, MI (US); Andrew D. Herman, Linden, MI (US); Hallett D. Breidenbach, West Bloomfield, MI (US); Deog H. Yoo, Inchon (KR); Craig A. Carlson, Honeoye Falls, NY (US)

(73) Assignee: Delphi Technologies, Inc., Troy, MI (US)

( * ) Notice: Subject to any disclaimer, the term of this patent is extended or adjusted under 35 U.S.C. 154(b) by 86 days.

(21) Appl. No.: 09/952,012

(22) Filed: Sep. 13, 2001

(65) Prior Publication Data

US 2002/0112699 A1 Aug. 22, 2002

Related U.S. Application Data

(60) Provisional application No. 60/232,265, filed on Sep. 14, 2000.

(51) Int. Cl.$^7$ ............................................... F02D 41/06
(52) U.S. Cl. .................... 123/491; 123/339.19
(58) Field of Search ............................ 123/491, 339.12, 123/339.19, 436, 536, 1 A, 350, 352; 73/117.3; 701/110

(56) References Cited

U.S. PATENT DOCUMENTS

| 6,079,396 A | * | 6/2000 | Ament et al. | 123/674 |
| 6,283,102 B1 | * | 9/2001 | Nelson et al. | 123/575 |
| 6,360,726 B1 | * | 3/2002 | Javaherian | 123/491 |

* cited by examiner

Primary Examiner—Hieu T. Vo
Assistant Examiner—Hai Huynh
(74) Attorney, Agent, or Firm—Jimmy L. Funke

(57) ABSTRACT

An improved engine fuel control detects combustion instability due to the use of high DI fuel during cold start and warm-up and compensates the fuel control for detected combustion instability through temporary enrichment of the delivered air/fuel ratio. When the engine idle speed error magnitude is less than a calibrated threshold, usage of high DI fuel is detected by identifying a surge signal based on the engine speed error fluctuation in a predetermined frequency range attributable to combustion instability due to the presence of high DI fuel in a cold engine. When the average amplitude of the surge signal exceeds a calibrated surge threshold, the presence of high DI fuel is detected. Additionally, the method is disabled for a prescribed period following commanded load transitions associated with the air conditioning system and the automatic transmission.

7 Claims, 5 Drawing Sheets

ENGINE STARTING AND WARM-UP FUEL CONTROL METHOD HAVING LOW VOLATILITY FUEL DETECTION AND COMPENSATION

This application claims benefit of Provisional No. 60/232,265 filed Sep. 14, 2000.

TECHNICAL FIELD

The present invention relates to a fuel control for an internal combustion engine designed to operate with a lean air/fuel ratio, and more particularly to a control that detects combustion instability due to the use of low volatility fuel during cold starting and warm-up, and for compensating the fuel control to alleviate detected instability.

BACKGROUND OF THE INVENTION

It is well known that motor vehicle fuels contain a variety of different compounds, and that the fuel volatility can therefore vary significantly from tank to tank. In an effort to quantify this variation, the industry has developed a driveability index (DI) based on a summation of specified distillation measurements, weighted to reflect their relative effect on combustion stability an internal combustion engine. In general, high volatility fuels have a relatively low DI value, whereas low volatility fuels have a relatively high DI value.

In an engine fuel control, the volatility of the injected fuel is most critical during cold starting and warm-up, since the internal surfaces of the engine may not be hot enough to vaporize a sufficient quantity of high DI fuel. For this reason, automotive fuel controls have traditionally been designed to enrich the cold calibration to ensure that the engine will start and run acceptably with high DI fuel. This enrichment to compensate for high DI fuel causes the air/fuel to be richer than optimum with medium and low DI fuel, resulting in higher hydrocarbon emissions than if the appropriate calibration were used. Thus, low emission engines designed to operate at leaner air/fuel ratios during cold starting and warm-up may experience degraded driveability due to combustion instability if a high DI fuel is being used. Accordingly, what is needed is a control method that permits the use of lean air/fuel ratio control during cold starting and warm-up while minimizing degraded driveability due to the use of high DI fuel.

SUMMARY OF THE INVENTION

The present invention is directed to an improved engine fuel control that detects combustion instability due to the use of high DI fuel during an engine idle period following starting and that compensates the fuel control for detected combustion instability through temporary enrichment of the delivered air/fuel ratio. When the engine idle speed error magnitude is less than a calibrated threshold, usage of high DI fuel is detected by identifying a surge signal based on the engine speed error fluctuation in a predetermined frequency range attributable to combustion instability due to the presence of high DI fuel in a cold engine. The speed error fluctuation content in the predetermined frequency range is identified with a Butterworth bandpass filter, and the bandpass filter output is low pass filtered to identify an average amplitude of the surge signal. When the engine speed error magnitude exceeds the calibrated threshold, the inputs of bandpass and low pass filters are set to zero. When the average amplitude of the surge signal exceeds a calibrated surge threshold, the presence of high DI fuel is detected. Additionally, the method is disabled for a prescribed period following commanded load transitions associated with the air conditioning system and the automatic transmission. When high DI fuel is detected, the air/fuel ratio of the engine is temporarily enriched to alleviate the instability and to ensure acceptable driveability without unnecessarily increasing hydrocarbon emissions in the engine exhaust gases.

BRIEF DESCRIPTION OF THE DRAWINGS

FIGS. 4–5 depict a routine for detecting combustion instability due to the use of high DI fuel during engine idling, and FIG. 6 depicts a routine for controlling the engine air/fuel ratio in response to the detection of high DI fuel.

DESCRIPTION OF THE PREFERRED EMBODIMENT

Figure 1:
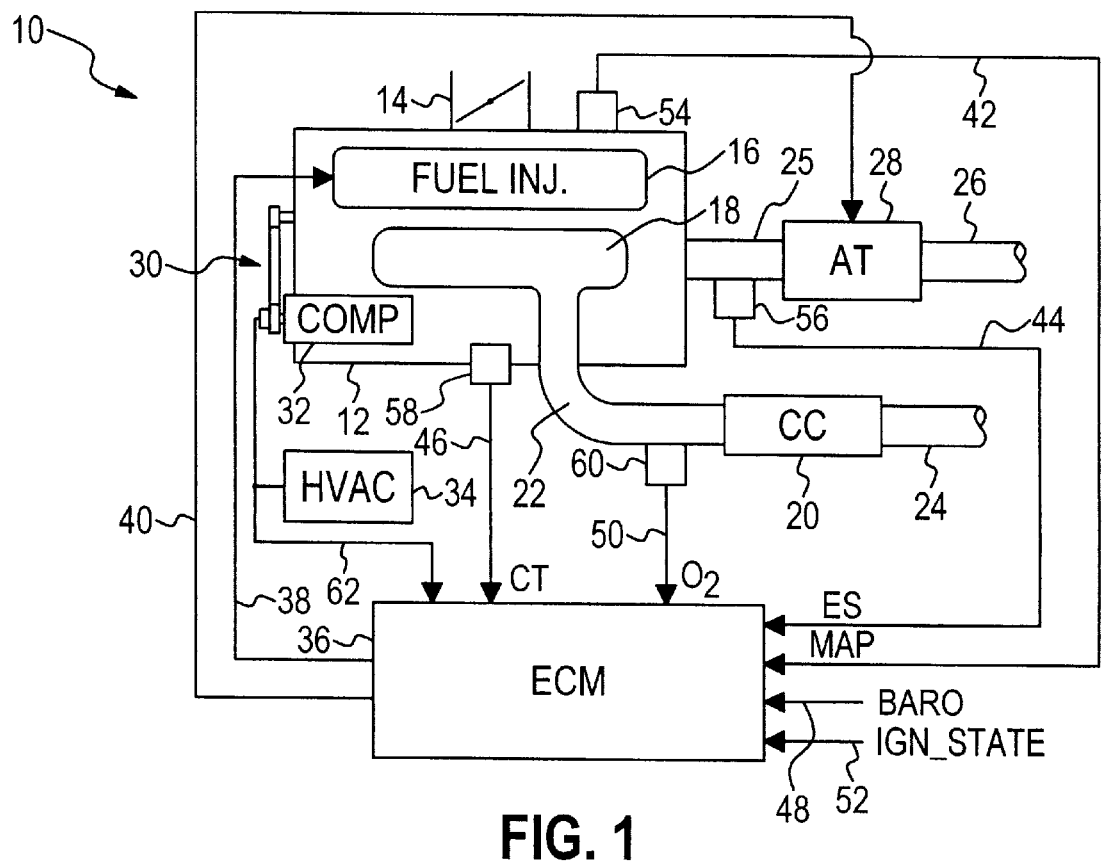
FIG. 1 is a diagram of an engine fuel control system, including a microprocessor-based engine control unit for controlling engine fueling.

Referring to the drawings, and particularly to FIG. 1, the reference numeral 10 generally designates a motor vehicle engine and control system according to this invention. The engine 12 includes a throttle valve 14 through which intake air is ingested, a fuel injection system 16 for injecting a precisely controlled quantity of fuel for mixture with the intake air, an exhaust manifold 18 for collecting exhaust gasses after the air/fuel mixture is ignited, a catalytic converter (CC) 20 coupled to the exhaust manifold 18 via runner 22, and a tail pipe 24 exiting the catalytic converter 20. The engine output shaft 25 is coupled to drive shaft 26 through an automatic transmission (AT) 28 as shown. Also, the engine 12 includes a pulley drive mechanism 30 for selectively driving the refrigerant compressor (COMP) 32 which is cycled on and off by a heating, ventilation and air conditioning (HVAC) control head 34 for controlled cooling and/or dehumidification of the vehicle cabin air.

The fuel injection system 16, automatic transmission 28 and other electronic sub-systems of the system 10 are controlled by a microprocessor-based engine control module (ECM) 36 in response to various inputs. To this end, ECM 36 is coupled to fuel injection system 16 via line 38, and to automatic transmission 28 via line 40. The control of transmission 28 primarily involves initiating shifting from one speed ratio to another in response to a number of inputs including engine speed and load, and the position of a driver manipulated range selector (not shown). The control of fuel injection system 16 involves determining an appropriate quantity of fuel to be injected into intake runners of engine 12 based on a measure or estimation of the ingested inlet mass air flow and a target air/fuel ratio for combustion in the engine cylinders. The input signals pertinent to these controls include the intake manifold absolute pressure (MAP) on line 42, the engine speed (ES) on line 44, the engine coolant temperature (CT) on line 46, the barometric pressure (BARO) on line 48, the exhaust gas oxygen signal (O2) on line 50, and the ignition state (IGN_STATE) on line 52. Such input signals are obtained with conventional sensors 54, 56, 58, 60 well known to those skilled in the art.

Additionally, the compressor cycling control signal produced by HVAC control head 34 is supplied as an input to ECM 36 via line 62.

In general, ECM 36 determines an appropriate quantity of fuel to be injected by fuel injection system 16 based on a measure or estimation of the ingested inlet mass air flow and a target air/fuel ratio for combustion in the engine cylinders. During cold starting and warm-up of the engine 12, the exhaust gas oxygen sensor 60 is inoperative, and the fuel injection quantity is determined in an open-loop manner based on the above mentioned inputs to produce an open-loop air/fuel ratio AFR_OL, such as depicted by the corresponding trace in FIG. 3. Such ratio may be somewhat richer than the stoichiometric ratio as indicated since the internal surfaces of engine 12 are initially too cool to completely vaporize the injected fuel. This is particularly the case if the driveability index (DI) of the fuel is relatively high, indicating that a relatively high temperature is required to vaporize specified percentages of the fuel. While hydrocarbon emissions can be minimized by starting engine 12 with an air/fuel ratio that is as lean as possible, combustion instability can occur if an insufficient percentage of the injected fuel vaporizes, and of course, the fuel volatility can vary considerably. The present invention permits the use of a relatively lean open-loop air/fuel ratio control during cold starting and warm-up without risking combustion instability due to the presence of high DI fuel by identifying engine speed variation that is characteristic of high DI fuel usage during an engine idle period following starting, and adjusting the open-loop fuel control to temporarily enrich the delivered air/fuel ratio when high DI fuel is detected.

Figure 2:
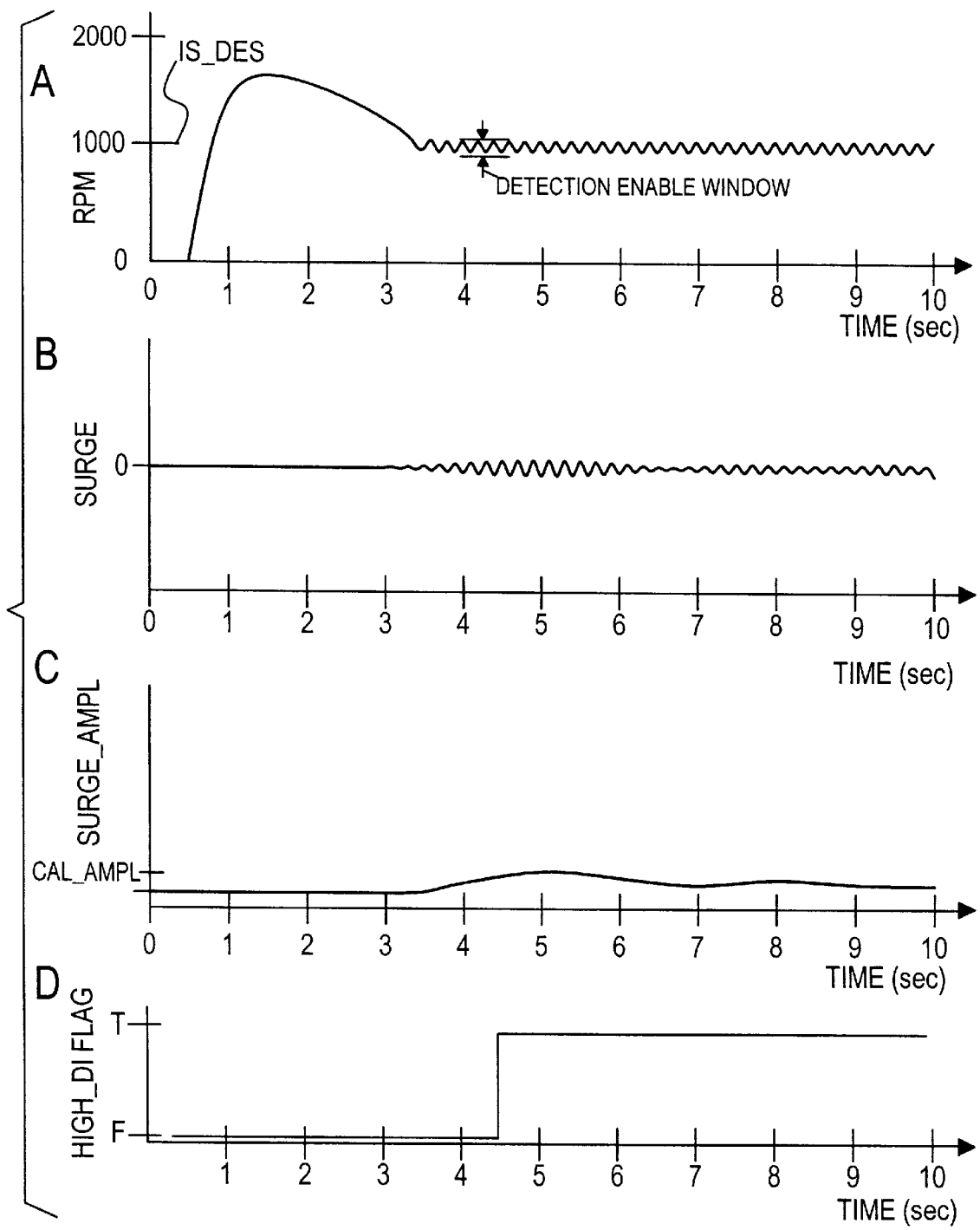
FIG. 2, Graphs A–D, graphically depict the operation of this invention when the engine of FIG. 1 is operated with high DI fuel.

The detection of high DI fuel according to this invention is graphically illustrated in FIG. 2. Graph A depicts the engine speed ES during an engine idle period, Graph B depicts a surge signal (SURGE) produced by a bandpass filter that extracts the engine speed error fluctuation in a predetermined frequency range attributable to high DI fuel usage in a cold engine, Graph C depicts the amplitude (SURGE_AMPL) of the surge signal, and Graph D depicts the status of a HIGH_DI flag according to this invention, all as a function of time. After starting, the average engine idle speed is regulated at a desired idle speed (IS_DES) such as 1000 RPM, as shown in Graph A. If the idle speed excursions from IS_DES (i.e., the idle speed error) are within a detection enable window as depicted in Graph A, the idle speed error is applied as an input to the bandpass filter, producing the surge signal (SURGE) depicted in Graph B. The SURGE_AMPL signal of Graph C is obtained by low pass filtering the SURGE signal. If the idle speed fluctuation increases to the point that it is no longer within the window, the inputs to the bandpass filter and the low-pass filter are forced to zero. The SURGE_AMPL signal represents the degree of sustained combustion instability due to usage of high DI fuel in a cold engine, and is compared to a calibrated amplitude (CAL_AMPL) as indicated in Graph C. When SURGE_AMPL exceeds CAL_AMPL, the HIGH_DI flag changes states from false (F) to true (T), indicating that high DI fuel has been detected. To de-sensitize the detection method to engine speed transients due to transitions of the refrigerant compressor 32 and/or automatic transmission 28, detection of high DI fuel usage is disabled for a prescribed time interval following commanded transitions of the compressor 32 and/or automatic transmission 28.

Figure 4:
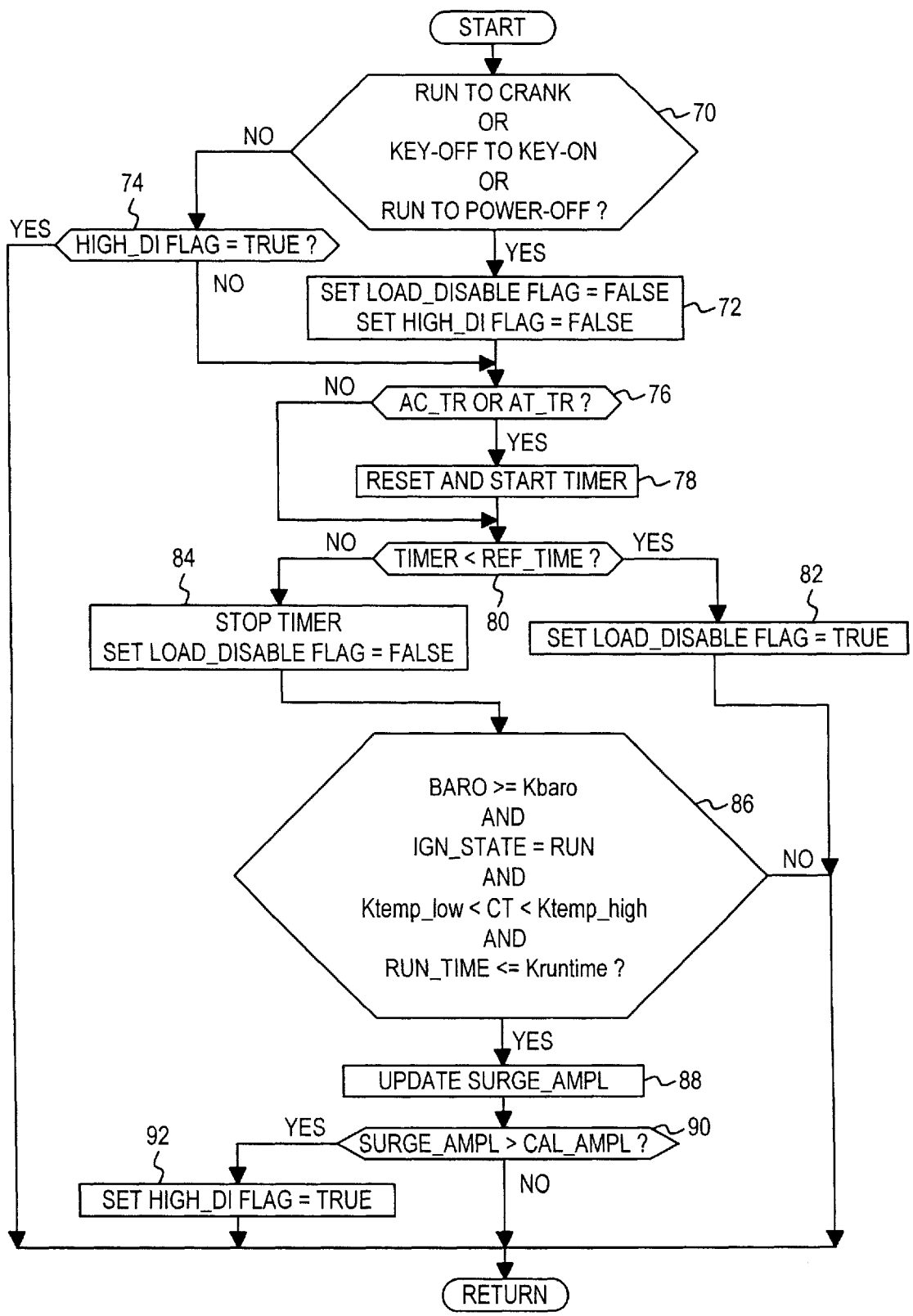
FIGS. 4–6 are flow diagrams representative of software routines executed by the engine control unit of FIG. 1 in carrying out the control of this invention.
Figure 5:
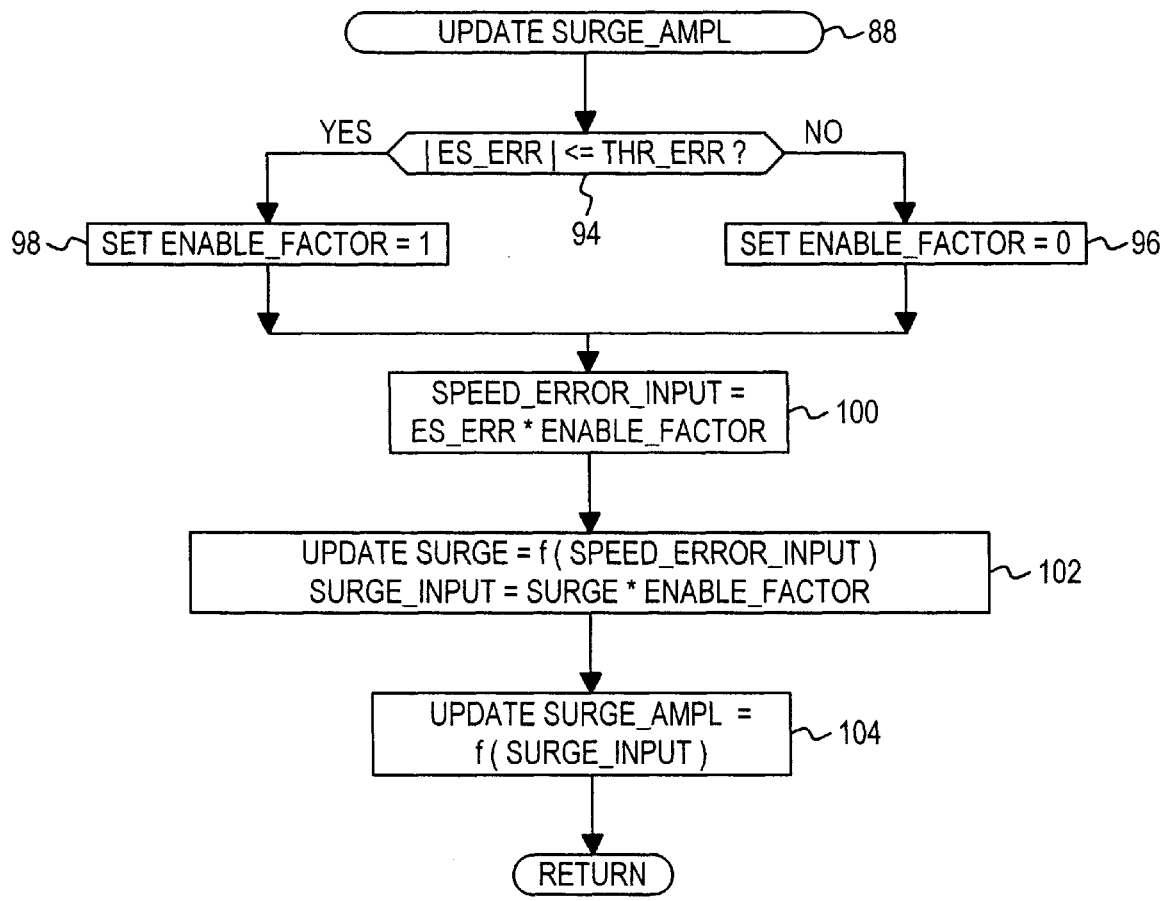

FIGS. 4–5 depict a flow diagram of a routine periodically executed by ECM 36 for carrying out the above-described detection method. Referring to FIG. 4, the blocks 70 and 72 initialize the LOAD_DISABLE and HIGH_DI flags when IGN_STATE indicates a transition from run to crank, key-off to key-on, or run to power-off. If block 70 is answered in the negative, but block 74 determines that the HIGH_DI flag is TRUE, the routine is exited. Otherwise, the block 76 is then executed to determine if a transition of the compressor 32 or automatic transmission 28 has occurred since the routine was last executed; if so, block 78 resets and restarts the timer. The block 80 then compares the timer value to REF_TIME. If the timer value is less than REF_TIME, the block 82 sets the LOAD_DISABLE flag to TRUE, and the routine is exited. If the timer value is greater than or equal to REF_TIME, the block 84 stops the timer and sets the LOAD_DISABLE flag to FALSE, and the block 86 checks a number of conditions to determine if high DI fuel detection is enabled. As indicated, high DI fuel detection is enabled if each of the following conditions is met: (1) the barometric pressure BARO exceeds a calibrated value Kbaro; (2) IGN_STATE is Run; (3) the engine coolant temperature CT is in a range defined by the calibrated values Ktemp_low, Ktemp_high; and (4) the engine run time (RUN_TIME) does not exceed a calibrated time Kruntime. If any of the conditions are not met, block 86 is answered in the negative and the routine is exited. If block 86 is answered in the affirmative, the block 88 updates SURGE_AMPL, and the block 90 compares SURGE_AMPL to CAL_AMPL. If SURGE_AMPL exceeds CAL_AMPL, the usage of high DI fuel is detected, and block 92 sets the HIGH_DI flag to TRUE, whereafter block 74 will be answered in the affirmative to prevent the HIGH_DI flag from being set to FALSE until the engine 12 stalls or is turned off.

FIG. 5 illustrates block 88 of FIG. 4 in further detail. First, the block 94 is executed to compare the absolute value of the engine speed error (|ES_ERR|) to a threshold THR_ERR corresponding to the detection enable window depicted in Graph A of FIG. 2. If |ES_ERR| exceeds THR_ERR, the speed error fluctuation is outside the detection enable window, and the block 96 sets an ENABLE_FACTOR to zero. If |ES_ERR| is less than or equal to THR_ERR, the speed error fluctuation is within the detection enable window, and the block 98 sets the ENABLE_FACTOR to one. Block 100 then computes the bandpass filter input (SPEED_ERROR_INPUT) according to the product (ES_ERR*ENABLE_FACTOR), effectively forcing the filter input to zero when the speed error fluctuation is outside the detection enable window. The block 102 then updates the bandpass filter using SPEED_ERROR_INPUT as an input, and determines the low-pass filter input (SURGE_INPUT). In the preferred embodiment, the bandpass filter is implemented with a four-state Butterworth filter that uses previous filter inputs and outputs. Algebraically, the bandpass filter may be expressed as:

$$\text{SURGE} = (B1 * FI_n) + (B2 * FI_{n-2}) - (A1 * FO_{n-1}) - (A2 * FO_{n-2})$$

and the input (SURGE_INPUT) to the low-pass filter is expressed as:

$$\text{SURGE\_INPUT} = \text{SURGE} * \text{ENABLE\_FACTOR}$$

In the bandpass filter equation, $FI_n$ and $FI_{n-1}$ respectively designate the current and once-past values of the filter input (SPEED_ERROR_INPUT), and $FO_{n-1}$ and $FO_{n-2}$ respectively designate the once-past and twice-past values of the filter output (SURGE). The coefficients B1, B2 and A2 may be constants, while the coefficient A1 sets the pass-band of the filter. Multiplying the bandpass filter output SURGE by ENABLE_FACTOR to form SURGE_INPUT effectively forces the low-pass filter input to zero when the speed error fluctuation is outside the detection enable window. Block 104 then updates the low-pass filter based on the value of SURGE_INPUT computed at block 102. The low-pass filter may be implemented as a first-order filter, as follows:

$$SURGE\_AMPL = (SURGE\_INPUT * Gf) + [(SURGE\_AMPL_{n-1} * (1-Gf)]$$

where $SURGE\_AMPL_{n-1}$ designates a once-past value of the filter output, and the gain factor Gf defines the filter time constant.

Figure 3:
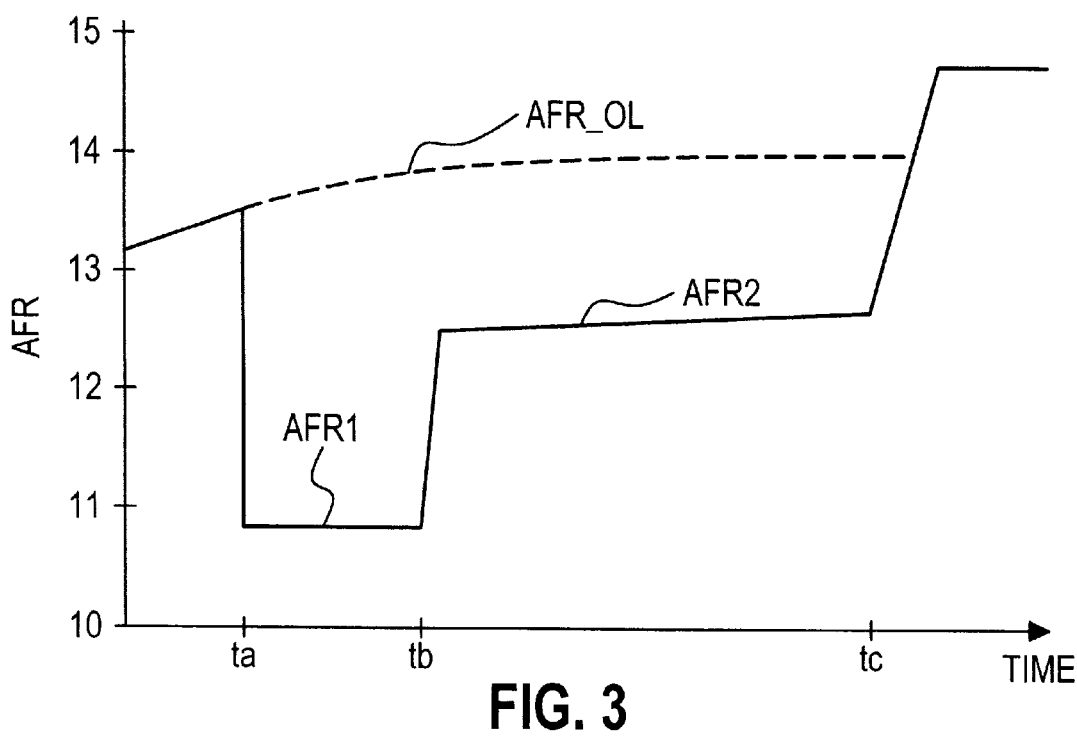
FIG. 3 is a graph depicting a control of engine air fuel ratio according to this invention.

Once the usage of high DI fuel is detected, the ECM 36 temporarily enriches the target air/fuel ratio, as graphically depicted in FIG. 3. When the HIGH_DI flag is set to TRUE at time ta, the desired air/fuel ratio is quickly reduced (enriched) to a fixed level AFR1 based on the product of the open-loop air/fuel ratio target AFR_OL at time ta and a first fuel enrichment factor FEF1 determined as a function of the engine coolant temperature CT, and held at AFR1 for a predetermined time HOLD_TIME (signified by the duration ta-tb). Thereafter, the desired air/fuel ratio is increased (enleaned) to a variable level AFR2 based on the product of the current open-loop air/fuel ratio target AFR_OL and a second fuel enrichment factor FEF2, also determined as a function of CT. When closed-loop fuel control is enabled at time tc, the engine 12 is considered to be warmed-up, and the desired air/fuel ratio is ramped up (enleaned) to the stoichiometric ratio (or other closed-loop target ratio), whereafter closed-loop fuel control is initiated.

Figure 6:
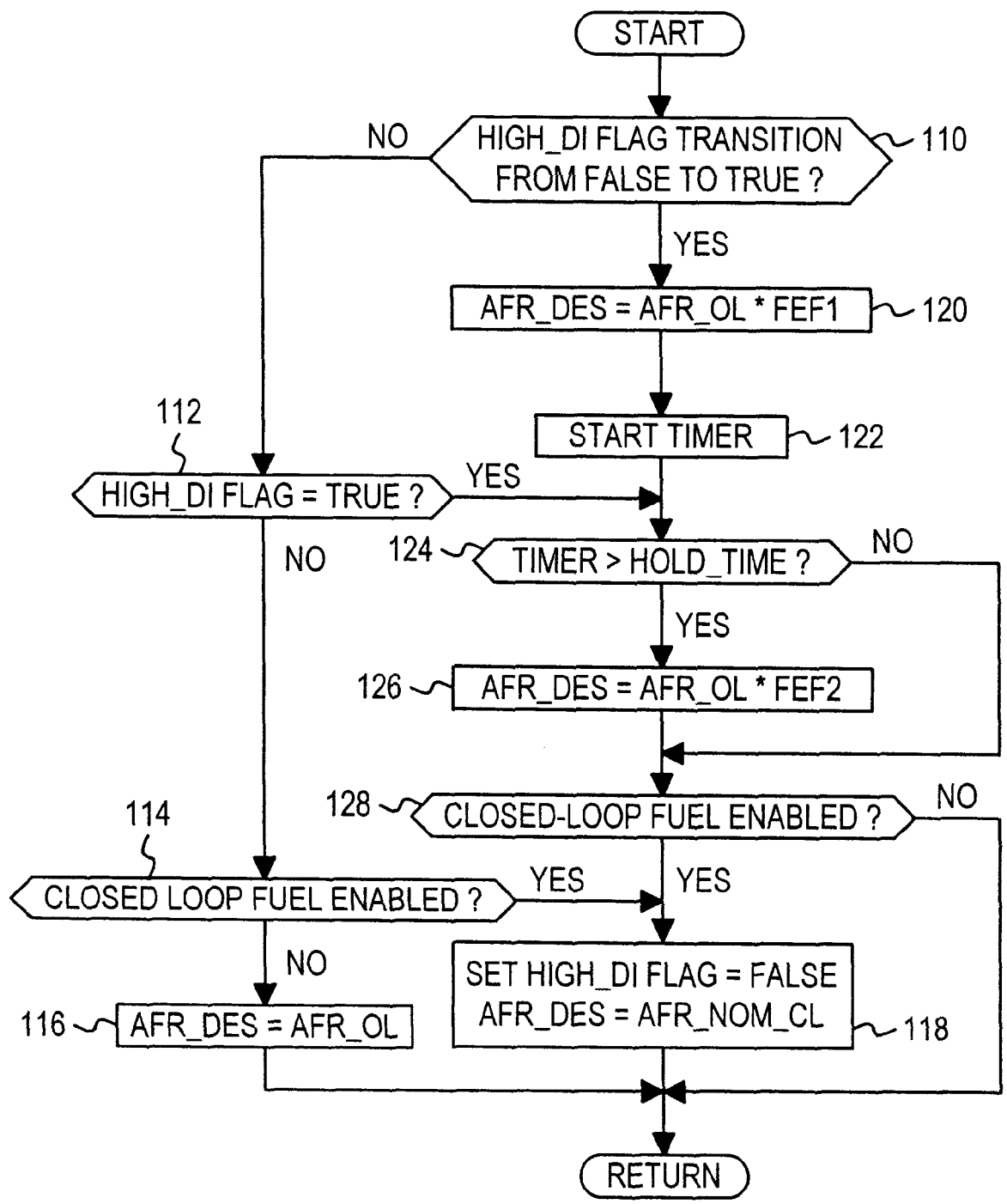

FIG. 6 depicts a flow diagram of a routine periodically executed by ECM 36 for carrying out the above-described air/fuel ratio control. Referring to FIG. 6, the block 110 is first executed to detect a transition of the HIGH_DI flag from FALSE to TRUE. Initially, of course, block 110 is answered in the negative, as are blocks 112 and 114, and block 116 sets the desired air/fuel ratio (AFR_DES) to AFR_OL. If the HIGH_DI flag is not set during an idle period following engine starting, AFR_OL is maintained until block 114 determines that closed-loop control is enabled, whereafter block 118 sets the HIGH_DI flag to FALSE and sets AFR_DES to the nominal closed-loop target ratio AFR_NOM_CL. When block 110 detects a transition of the HIGH_DI flag, block 120 sets AFR_DES to the product (AFR_OL*FEF1), and block 122 starts a timer. If the timer reaches HOLD_TIME before closed-loop fuel control is enabled, as determined by blocks 124 and 128, the block 126 is executed to set AFR_DES to the product (AFR_OL*FEF2). And when closed-loop fuel control is finally enabled, the block 118 is executed as described above to set the HIGH_DI flag to FALSE and set AFR_DES to the nominal closed-loop target ratio AFR_NOM_CL.

In summary, the control method of the present invention detects combustion instability due to the use of high DI fuel during cold starting and warm-up and compensates the fuel control for detected combustion instability. When the presence of high DI fuel is detected, the air/fuel ratio is temporarily enriched to alleviate the instability and to ensure acceptable driveability without unnecessarily increasing hydrocarbon emissions in the engine exhaust gases. While the present invention has been described in reference to the illustrated embodiments, it is expected that various modifications in addition to those mentioned above will occur to those skilled in the art. Thus, it will be understood that methods incorporating these and other modifications may fall within the scope of this invention, which is defined by the appended claims.

What is claimed is:

1. A method of operation for an internal combustion engine having an open-loop fuel control for maintaining an air/fuel ratio of said engine at a target value during engine starting and warm-up, comprising the steps of:

measuring a speed of said engine during engine idling following starting;

determining an engine speed error based on deviations of said measured speed from a desired idle speed;

bandpass filtering an error signal based on said determined engine speed error to form a surge signal representative of speed error fluctuation in a predetermined frequency range attributable to usage of high driveability index fuel in a cold engine;

low-pass filtering said surge signal to determine a sustained amplitude of said surge signal;

detecting usage of high driveability index fuel if the sustained amplitude of the surge signal exceeds a calibrated threshold; and temporarily enriching said air/fuel ratio relative to said target value when the presence of high driveability index fuel is detected.

2. The method of operation of claim 1, including the steps of:

detecting engine load transitions that influence engine speed; and detecting the presence of high driveability index fuel if said engine load transitions are not detected and the sustained amplitude of the surge signal exceeds a calibrated threshold.

3. The method of operation of claim 2, including the step of:

disabling the step of detecting the presence of high driveability index fuel for a prescribed time interval following detection of an engine load transition.

4. The method of operation of claim 1, including the step of:

disabling the step of detecting the presence of high driveability index fuel unless a temperature of the engine is within a prescribed range and a run time of the engine is less than a calibrated run time.

5. The method of operation of claim 1, wherein the step of temporarily enriching said air/fuel ratio includes the steps of:

holding said air/fuel ratio at a first value determined as a function of said target value and a temperature of said engine;

controlling said air/fuel ratio according to a second value intermediate said first value and said target value; and adjusting said air/fuel ratio to a closed-loop target value when the engine upon completion of said warm-up.

6. The method of operation of claim 1, including the step of:

forcing said error signal to zero when the determined engine speed error exceeds a threshold error.

7. The method of operation of claim 1, including the step of:

forcing said surge signal to zero when the determined engine speed error exceeds a threshold error.

* * * * *